US011462118B1

(12) United States Patent
Saxena et al.

(10) Patent No.: US 11,462,118 B1
(45) Date of Patent: Oct. 4, 2022

(54) COGNITIVE GENERATION OF LEARNING PATH FRAMEWORK

(71) Applicant: International Business Machines Corporation, Armonk, NY (US)

(72) Inventors: Rajesh Kumar Saxena, Maharashtra (IN); Harish Bharti, Pune (IN); Rakesh Shinde, Maharashtra (IN); Sandeep Sukhija, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 17/200,218

(22) Filed: Mar. 12, 2021

(51) Int. Cl.
G09B 7/04 (2006.01)
G09B 5/12 (2006.01)

(52) U.S. Cl.
CPC .............. G09B 7/04 (2013.01); G09B 5/125 (2013.01)

(58) Field of Classification Search
CPC .................................. G09B 5/125; G09B 7/04
See application file for complete search history.

(56) References Cited

U.S. PATENT DOCUMENTS

| 8,465,288 | B1* | 6/2013 | Roers | G09B 7/08 434/323 |
| 8,764,455 | B1* | 7/2014 | Morrison | G09B 7/00 434/323 |
| 9,443,443 | B2* | 9/2016 | Ko | G09B 3/00 |
| 9,583,016 | B2* | 2/2017 | Katz | G09B 5/00 |
| 9,704,102 | B2* | 7/2017 | Baraniuk | G09B 7/00 |
| 2010/0153283 | A1 | 6/2010 | Bruce | |
| 2016/0358486 | A1 | 12/2016 | Bilic | |
| 2017/0046971 | A1* | 2/2017 | Moreno | G09B 19/00 |
| 2018/0090022 | A1* | 3/2018 | Bouillet | G09B 5/12 |
| 2021/0390876 | A1* | 12/2021 | Publicover | G09B 19/00 |
| 2022/0208018 | A1* | 6/2022 | Khazaeni | G06F 16/901 |

OTHER PUBLICATIONS

"A Method and System for Recommending Learning Activities Based on Weighted Policies", An IP.com Prior Art Database Technical Disclosure, Original Publication Date: Mar. 27, 2009, IP.com No. IPCOM000181291D, IP.com Electronic Publication Date: Mar. 27, 2009, 4 pages.

(Continued)

Primary Examiner — Justin S Lee
(74) Attorney, Agent, or Firm — Nicholas A. Welling

(57) ABSTRACT

An approach to generating a learning path framework may be provided. A Cognitive Bot may monitor the knowledge stream of a subject matter expert (SME) to glean insights from the activities and events performed by the SME. The CogBot determine categories within the subject matter. The CogBot may tune a grade scoring engine using the insights gleaned from the knowledge stream as a threshold for the grade scoring module. The knowledge stream of a second user may be monitored by a CogBot. A grade score of the subject matter for the second user may be generated by the grade scoring engine. An expertise level associated with the categories may be determined. A learning path framework may be generated based on the generated grade score and expertise level.

20 Claims, 6 Drawing Sheets

(56) References Cited

OTHER PUBLICATIONS

"Cognitive Build, System and method to perform employee skills & traits SWOT analysis and also recommend learning plans on multiple aspects based on the prebuilt skill & trait profile", An IP.com Prior Art Database Technical Disclosure, Authors et al.: Disclosed Anonymously, IP.com No. IPCOM000250914D, IP.com Electronic Publication Date: Sep. 14, 2017, 3 pages.

Dwivedi et al., "Learning path recommendation based on modified variable length genetic algorithm", Educ Inf Technol, DOI 10.1007/s10639-017-9637-7, Published online Aug. 19, 2017, 18 pages.

Haines, Stuart T., "The Mentor-Protege Relationship", American Journal of Pharmaceutical Education 2003; 67 (3) Article 82, 8 pages.

Liu et al., "Exploiting Cognitive Structure for Adaptive Learning", arXiv:1905.12470v1 [cs.CY] May 23, 2019, 25th ACM SIGKDD Conference on Knowledge Discovery and Data Mining (KDD '19), Aug. 4-8, 2019, Anchorage, AK, USA, 9 pages, <https://doi.org/10.1145/3292500.3330922>.

Mell et al., "The NIST Definition of Cloud Computing", Recommendations of the National Institute of Standards and Technology, Special Publication 800-145, Sep. 2011, 7 pages.

\* cited by examiner

COGNITIVE GENERATION OF LEARNING PATH FRAMEWORK

BACKGROUND OF THE INVENTION

The present invention relates generally to the field of adaptive curriculum sequencing, more specifically, cognitive generation of a learning path framework.

A mentor or teacher can be a valuable resource when it comes to being informed on a subject. A learning path framework or curriculum guide can allow an individual seeking knowledge to have an efficient and effective method of learning. However, in some situations many individuals may have a general understanding of some topics within a specific subject matter. A personalized learning framework can be obtained through determining the knowledge of a user for a given subject matter, which can allow for the generation of a sequence of personalized learning activities to address the topics an individual is less knowledgeable about, while spending less or no time on previously mastered topics.

Artificial intelligence and cognitive services have become more available to the general public. Analyzing unstructured data and structured data has allowed for numerous advancements, due to the ability to detect correlations between multiple data sources. Cognitive Bots ("CogBots") are bots with the capability to monitor data streams, classify images and text, and/or understand natural language within multiple data sources accessed by an individual and build insights associated from the data sources.

SUMMARY

Embodiments of the present disclosure include a computer-implemented method, computer program product, and a system for cognitive generation of a learning path framework. Embodiments may include monitoring the knowledge stream of a first user on a CogBot platform, wherein the monitoring of the first user's knowledge stream is performed by a cognitive bot. One or more categories within the subject matter may be generated. The generated categories may be based on monitoring of the knowledge stream. A grade-score engine for a subject matter may be tuned by the CogBot. The tuning of the grade-score engine may be based on the monitoring of the knowledge stream of the first user. The knowledge stream of a second user may be monitored by the CogBot. A grade-score may be generated for the second user, based on monitoring the second user's knowledge stream by the CogBot. An expertise level of the second user may be determined for the one or more categories based on the generated grade-score. A learning path framework may be generated for the second user based on the determined expertise levels for the categories.

The above summary is not intended to describe each illustrated embodiment of every implementation of the present disclosure.

Figure 1:
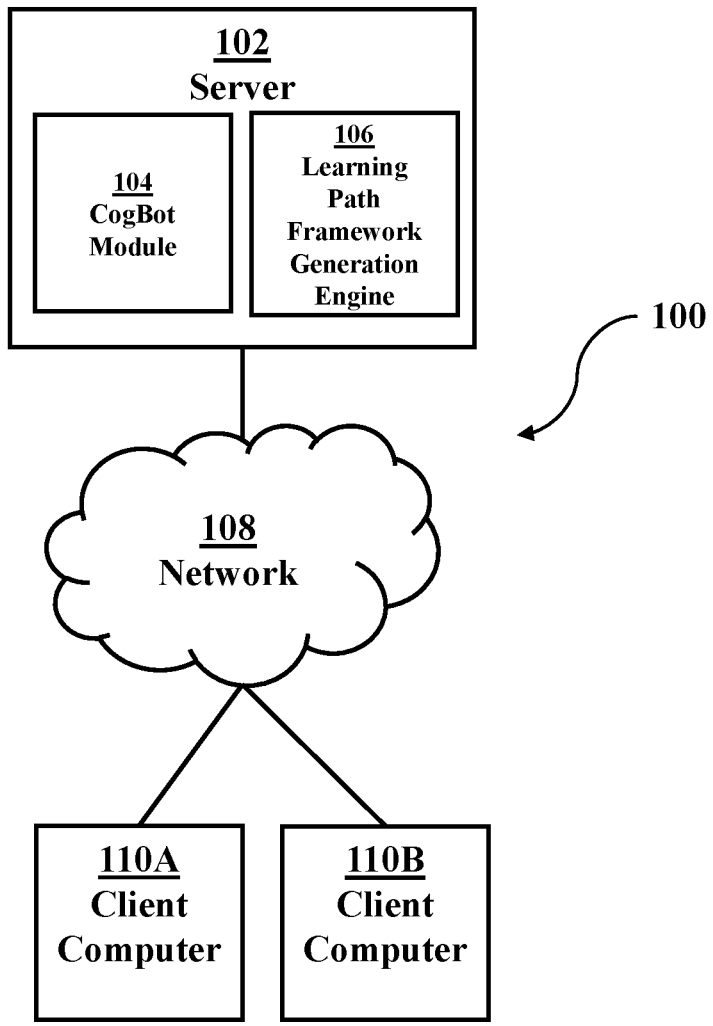
FIG. 1 is a functional block diagram generally depicting a learning path framework generation environment, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted allow for the cognitive generation of a learning path framework. In an embodiment, a cognitive bot ('CogBot') can monitor the knowledge stream of a first user who is a subject matter expert ("SME') in a given subject matter. From the monitoring of the knowledge stream, the CogBot can glean insights from the activities and events of the SME. The monitoring of the SME allows for a mastery threshold for the subject matter. Additionally, the CogBot can develop topic categories within the subject matter. The CogBot can use the insights to tune a grade score engine. A second CogBot can monitor the knowledge stream of a second user. The second user is an individual that is not a SME, but an individual seeking to increase his or her knowledge in the subject matter. The second CogBot can generate insights from the activities performed within the second knowledge stream. The insights can be used to generate a grade score and an expertise level for the categories within the subject developed by the first CogBot. The expertise score can be used to develop a learning path framework for the second user.

In some embodiments, the learning path framework can be updated. Once the learning path framework is generated, the second user's CogBot can continue to monitor the knowledge stream of the second user. Insights can be developed by the CogBot based on the monitoring. The insights can be used by the grade score engine to generate a second expertise level, for the categories within the subject matter. The learning path framework can be updated using the second expertise level.

FIG. 1 is a functional block diagram depicting a learning path framework generation environment 100. Learning path framework generation environment 100 comprises CogBot module 104 and learning path framework generation engine 106 operational on server 102, client computer 110A and 110B and network 108.

Server 102 and client computers 110A and 110B can be a standalone computing device, a management server, a web server, a mobile computing device, or any other electronic device or computing system capable of receiving, sending, and processing data. In other embodiments, server 102 and client computers 110A and 110B can represent a server computing system utilizing multiple computers as a server system. In another embodiment, server 102 and client computers 110A and 110B can be a laptop computer, a tablet computer, a netbook computer, a personal computer, a desktop computer, or any programmable electronic device capable of communicating with other computing devices within learning path framework generation environment 100 via network 108.

In another embodiment, server 102 and client computers 110A and 110B represent a computing system utilizing clustered computers and components (e.g., database server computers, application server computers, etc.) that can act as a single pool of seamless resources when accessed within learning path framework generation environment 100. Server 102 and client computers 110A and 110B can include internal and external hardware components, as depicted and described in further detail with respect to FIG. 4. It should be noted, while only server 102 and client computers 110A and 110B are shown in FIG. 1, multiple computing devices can be present within learning path framework generation environment 100. In an example, server 102 and client computers 110A and 110B can be a part of a cloud server network in which a computing device (not shown) connected to network 108 can access server 102 and client computers 110A and 110B (e.g. the internet).

The CogBot Module 104 is a computer module with cognitive or artificial intelligence capabilities that can monitor the knowledge stream of a user to develop insights for with a subject matter. A knowledge stream is the activities and events performed by the user (which can be monitored in real-time or at predetermined intervals by the CogBot) associated with a learning mastery objective. CogBot module 104 can create one or more instances of a CogBot to monitor one user. CogBot module 104 can be trained in natural language processing to understand structured and unstructured data associated with activities and events within the knowledge stream of a user. In some embodiments, CogBot Module 104 can generate instances of a CogBot that has been trained with a model capable of optical character recognition. For example, if a user is reading a portable document format ("PDF") of an article within the subject matter that has been scanned, the CogBot can identify the characters within the PDF and convert the characters into a computer understandable format (e.g. tokens, word vectors, etc.). CogBots generated by CogBot module 104 can be configured models, such as deep learning models including recurrent neural network, convolutional neural network, and the like. Additionally, in some embodiments, CogBot module can be configured to understand videos including the natural language and images associated with the video. For example, if a user is viewing an instructional video on advanced kidney surgical procedures, the CogBot can generate a transcript for the instructional video from which it will develop a knowledge base. Additionally, the CogBot may be configured with image recognition to recognize specific structures within the kidney. In some embodiments, an artificial intelligence model or cognitive model may be the base model for CogBot module 104, for example Watson by IBM®.

In some embodiments, CogBot module 104 can be associated with a CogBot platform (not shown). A CogBot platform can be a cloud based service to which a user subscribes. For example, a user can subscribe to a learning platform that is a CogBot platform. A CogBot platform can be located on server 102 and can be a subscription service. A user can be provided with a username and a password to authenticate the user's CogBot platform session. The CogBot module 104 can generate a CogBot to monitor the user's activities within the session. The CogBot platform may be associated with a specific subject matter (e.g., thermodynamics, computer programming, chemistry, basket weaving, video games, baking, etc.) SMEs may be monitored by the CogBot to set a benchmark for a subject matter. In an embodiment, a user may have a profile, in which the user inputs their education or certifications associated with the subject matter. Further, the CogBot can assess the time spent on certain activities to determine the user's familiarity with a topic within the subject matter with a learning objective. In some embodiments, the CogBot can determine if categories of topics within the subject matter and relationships between the categories. CogBot module 104 can be configured to align the categories within the subject matter. In some embodiments, CogBot module 104 can be configured to understand a user based on natural language responses to critical thinking questions. CogBot module 104 can be configured to generate word representations for previously unknown words associated with the subject matter. It should be noted, CogBot module 104 can possess machine learning capabilities in which the knowledge and understanding derived from monitoring a user's knowledge stream and gleaning insights continues to build upon previous understanding of the CogBot module. The understanding derived can include the learning style and preferences of a user or users, allowing for a more personalized learning path framework.

Learning path framework generation engine 106 is a computer program that can be configured to generate a learning path framework for a subject matter, based on the cognitive insights gleaned from the knowledge stream of a user by a CogBot. Learning path framework generation engine 106 can determine an expertise level of a topic subject based on a grade score generated from the insights of one or more CogBots. Further, learning path framework generation engine 106 can be configured to generate a learning path framework based on the expertise level determined within a category. A learning path framework is a curriculum of activities and events for a less knowledgeable user to follow. The learning path framework is based on the previous activities of SMEs, which are used by learning path framework generation engine 106 to develop a baseline of mastery for the subject matter or categories within the subject matter. It should be noted, more than one SME may be used to establish a baseline of knowledge mastery within a subject matter, as some SMEs may have better understanding of certain topic categories within the subject matter.

Network 108 can be a local area network (LAN), a wide area network (WAN) such as the Internet, or a combination of the two, and can include wired, wireless, or fiber optic connections. In general, network 108 can be any combination of connections and protocols that will support communications between server 102, client computers 110A and 110B, and other computing devices (not shown).

Figure 2:
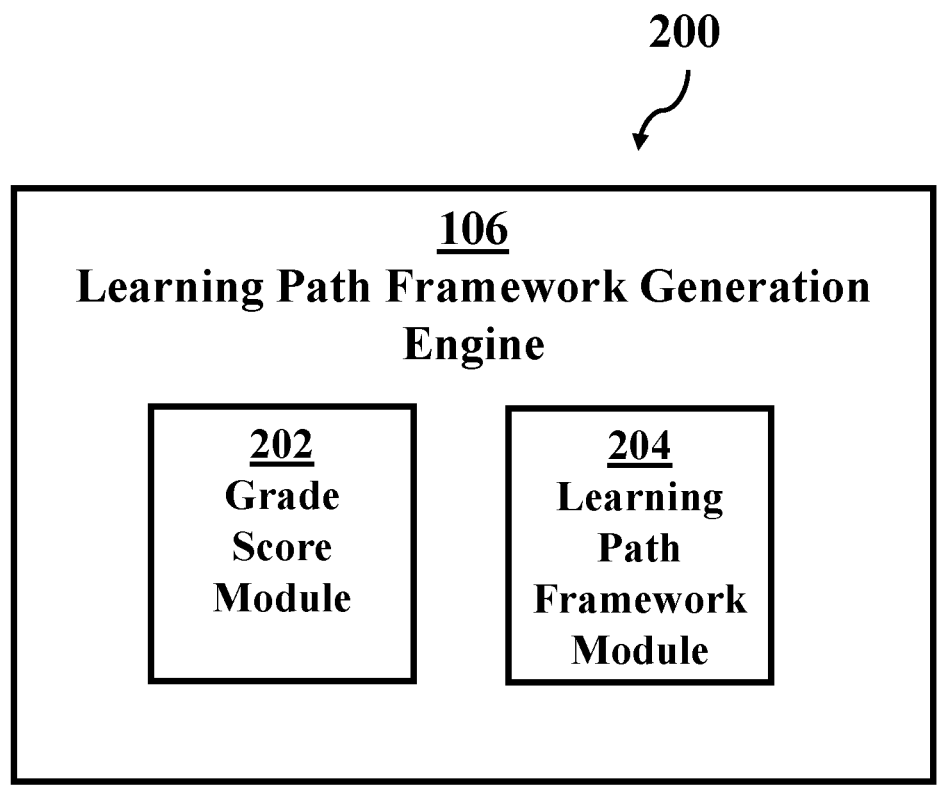
FIG. 2 is a functional block diagram depicting a learning path framework generation engine, in accordance with an embodiment of the present invention.

FIG. 2 is a functional block diagram 200 depicting a learning path framework generation engine 106, in accordance with an embodiment of the present invention. Operational learning path framework generation engine 106 includes grade score module 202 and learning path framework module 204.

Grade score module 202 is a computer program that can be configured to determine a grade score of a category for a user within a subject matter. The grade score is a measure of the user's expertise level for a given category. In some embodiments, the grade score can be determined using an implicit topic model, where each topic being assessed for the user is scored. An implicit score "$S_i$" is an implicit score, which can be converted into an actual grade-score value, thus, $$S_i = \frac{A_i}{\partial_{max}(A_i)} (i = \{1 \ldots 3\})$$

Where, $\partial_{max}(A_i)$ represents maximum information allowed for time (A1), score (A2) or frequency (A3) respectively. A1 is a topic time grade-score, which is the sum of all of the user's session times. A2 is a Topic preference grade-score, which is the user's score for a specific topic resource. A3 is a Topic frequency of use, which is the number of accesses made to the topic.

Thereafter, the implicit grade-score category j is calculated as:

$$j = \begin{cases} 0(A_1), & w_1 \leq S_i \leq w_2 \\ 1(A_2), & w_3 \leq S_i \leq w_4 \\ 2(A_3), & w_5 \leq S_i \leq w_6 \end{cases}$$

Where, A1, A2 and A3 denote CogBot grade-score categories and w1, w2, ..., w6 denote limiting values. Calculating j associated with topic score we can substitute, "w1=0", "w2=a", "w3=a", "w4=1−α", "w5=1−α", and "w6=1". Additionally, "α" is in the interval (0, 0.5).

Using adaptive reasoning based on CogBot insights, a user expertise level can be determined by grade score module 202, where a user's ability estimate includes the level of a latent trait of the user, demonstrated in an observed polytomous (e.g., where a user can achieve more than two grade-score categories for a specific item) grade-score pattern Where in the following: "Fk", is the specific difficulty, such that, (k=0, 1, ..., j, ..., t) with F0=0, providing:

$$\sum_{k=0}^{j} F_k = 0$$

The Joint Maximum Likelihood Estimation can be used for estimating the user's ability that maximizes the likelihood function for a particular grade-score. $P_{aij}$ is the probability that the user a will select the $j^{th}$ grade-score category of item i, which is calculated as follow:

$$P_{aij} = \frac{e^{j(M-D_i) - \sum_{k=0}^{j} F_k}}{\sum_{h=0}^{t} e^{h(M-D_i) - \sum_{k=0}^{h} F_k}}$$

where, "M", is the grade-score scales used to measure user's ability. "$D_i$", is the item's difficulty, "t+1" and ordinal grade-score categories 0, 1, ..., j, ..., t, are for the topics accessed.

Additionally, the expected score ES can be defined as the sum of the expected value of the ratings over all individual items, thus the modelled expected rating sum over all topics is as follows:

$$ES = \sum_{i=1}^{l} \sum_{j=0}^{t} j P_{aij}$$

While, modelled variance V of the expected score ES at specific user's ability M is given by the sum of the variances of the individual items' expected values:

$$V = \sum_{i=1}^{l} \left[ \left( \sum_{j=0}^{t} j^2 P_{aij} \right) - \left( \sum_{j=0}^{c} j P_{aij} \right)^2 \right]$$

The initial estimate of user's ability M can be any finite value and can be obtained as a standard as follows:

$$M = D_{mean} + \log\left(\frac{R - R_{min}}{R_{max} - R}\right)$$

where, $$D_{mean} = \frac{1}{l} \sum_{i=1}^{l} D_i$$

DMean denotes the average item's difficulty in l items, R is the raw score, RMin is the minimum possible score, and RMax is the maximum possible score.

When the previous equations are iteratively solved, the final ability can be calculated as follows:

$$M' = M + \frac{R - ES}{V}$$

Learning path framework module 204 is a computer program that can be configured to generate a learning path framework for a user, based on the grade score determined by grade score module 202. A learning path framework can be a curriculum sequence of activities and actions to increase a user's mastery or expertise level in a subject or topic category to that of a SMEs mastery. The topic category knowledge gap can be determined by calculating the distance between a SMEs expertise level and the user expertise level per category of the subject matter, based on the user's determined grade score and expertise score. In some embodiments, a learning path can be generated in the following manner: identifying the maximum information, whereas the item information is the expected variance of scoring functions based on probability along the observation ability M, so the expected value E(M) is calculated as follows:

$$E(M) = \sum_{j=0}^{t} j P_{ij}$$

E(M) denotes the expected score function. M denotes a user's category knowledge estimated after n preceding topic resources, Pij represents the probability of a $j^{th}$ grade-score category for the user with ability M, $$I(M) = \left(\sum_{j=0}^{t} j^2 \, P_{ij}\right) - (E(M))^2$$

I(M) is the information function as shown above that represents the information contributed by specific topic access i across the range of user's ability M. In this instance, a topic with a higher I(M) would be more effective in increasing the user's mastery in the topic.

Figure 3:
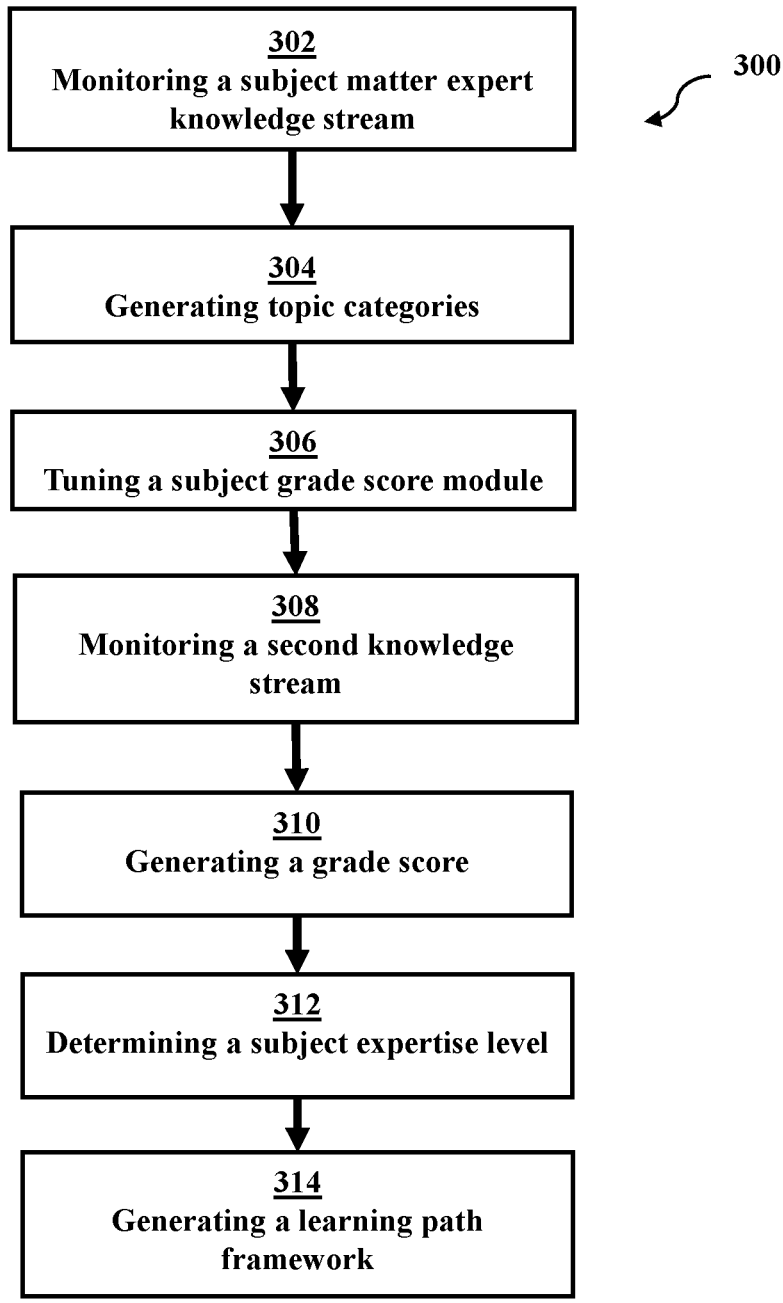
FIG. 3 is a flowchart depicting a method for cognitive generation of a learning path framework, in accordance with an embodiment of the present invention.

FIG. 3 is a flowchart depicting method 300 for cognitive generation of a learning framework, in accordance with an embodiment of the present invention.

At step 302, a CogBot instance from CogBot module 104 monitors the knowledge stream of a user. In some embodiments, the user is a SME. For example, a SME that has logged into a CogBot platform will have a CogBot that monitors the user's knowledge stream. The CogBot platform may be a platform for computer programming (e.g., Python, JavaScript, C++). The CogBot can be configured to monitor activities and events in which the user participates. For example, the user may participate in a seminar for programming advanced neural networks in Python. In some embodiments, CogBot module 104 can be configured with an optical character recognition capability paired with natural language processing capabilities (e.g. word2vec, BERT, XLNet, BOWs, etc.). The CogBot can determine insights from the monitoring of the knowledge stream, developing an understanding of the subject matter. In some embodiments, the knowledge stream may contain activities, such as assessments, which the user may complete further allowing for the CogBot to determine the mastery threshold level for the subject matter of the user and/or which activities events correlate to certain categories of the subject. Further, in some embodiments, the CogBot can determine the difficulty of a category or activity depending on the time spent on the activity, the frequency an activity is accessed, and/or the number of attempts required for a user to obtain a passing score.

At step 304, the CogBot from CogBot module 104 generates topic categories for the subject matter. The generated categories can be based on the insights and understanding determined from monitoring the user's knowledge stream. For example, the user may take a series of lectures about autoencoder neural networks while also reviewing multiple peer reviewed articles on recurrent neural networks and convolutional neural networks. The CogBot can use natural language processing capabilities to determine that each of these falls under the subject matter of neural networks, but that each one is a distinct architecture, and therefore all are a topic category within the subject matter of neural networks. Further, in some embodiments, the CogBot can use image classification to develop an understanding of the architectures of each type of neural network referenced above.

At step 306, the CogBot uses the insights developed from the user's knowledge stream to tune a grade score module for the subject matter. Tuning a grade score module 202, may include setting the base threshold for mastery of a subject matter or category, based on the insights generated from the CogBot monitoring the user's knowledge stream. In some embodiments, the CogBot can assign a numerical value to topics and/or categories. For example, the CogBot may assign a value to the time spent on a certain activity or event within a subject matter. Additionally, the CogBot may assign a value to a grade received in certain activities (e.g. assessments) or events. Further, the CogBot may assign a value to the frequency the user accesses an activity or topic. For example, if a user spends more time on an event within a category and accesses an activity within an the same category, the CogBot may assign a higher difficulty value to that category.

At step 308, a second CogBot instance from CogBot Module 104 can monitor the knowledge stream of a second user. In some embodiments, a second user can log into a CogBot platform and perform activities and events associated with a subject matter. The knowledge stream can have information regarding a learning objective relating to the subject matter for the second user. For example, the user may desire to increase his or her knowledge in long-term short-term memory neural networks. In some embodiments, the second user may be less knowledgeable than the first user in the subject matter. The user can complete assessments and events associated with the subject matter, allowing the second CogBot to develop insights for the knowledge of the user. In some embodiments, the CogBot will assign numerical values to the time spent on an activity, the score of assessments, and the frequency which the second user accesses each activity or event. For example, the second user may possess a great deal of knowledge regarding programming in Java Script but be a novice at programming in Python. The second user does not spend much time accessing Java Script activities and receives high scores in assessments associated with Java Script. The second user spends a great deal of time completing Python activities and accesses the activities frequently. Further, a user profile may be within the knowledge stream, allowing the CogBot to develop a deeper insight into a user's knowledge of the subject matter.

At step 310, grade score module 202 can generate a grade score of the subject matter for the second user, based on the CogBot monitoring the knowledge stream of the second user. In an embodiment, the CogBot monitoring the second user's knowledge stream can send the numerical values associated with the activities and events to grade score module 202. A grade score is a user's overall knowledge of the subject matter associated with the learning objective. Grade Score module 202 can calculate a grade score for the subject matter based on the numerical values and generate a grade score against the SME for the subject matter baseline established during tuning.

At step 312, grade score module 202 can determine an expertise level for the generated categories, based on the grade score and insights determined by the CogBot. In some embodiments, an expertise level is the second user's mastery of the topic category within the subject matter. This can be used to determine the learning path framework. In some embodiments, an expertise level for one topic categories can be determined based on the time spent and the scores received for activities and events associated with the topic. It should be noted an event or activity can be associated with one or more topic categories and impact one or more expertise levels. For example, if a user is performing an activity requiring the user to program a convolutional neural network in python programming language, the category could include activities and events with programming in python, convolutional neural networks, and linear algebra.

At step 314, a learning path framework is generated by learning path framework module 204 based on the grade score and expertise level from grade score module 202. A learning path framework is a prescribed curriculum and recommendations for the second user. The learning path framework can also be a recommendation for a mentor to assist the second user that is less knowledgeable in the subject matter. In some embodiments, the mentor may be a subscriber to the CogBot platform, that has authorized the service to assign a her a protégé. The mentor can assist the second user in completing the learning path framework. In some embodiments, one or more activities and events can be prescribed within the framework, including a timeline for completing the activities and events. For example, an intermediate difficulty learning module for python programming objects may be prescribed, followed by a refresher module in linear algebra and subsequently a module on programming long-short term memory neural networks programmed in python. In another example, a mentor competent in convolutional neural networks may be assigned to the second user along with a prescribed personalized learning curriculum, due to the second user's familiarity with autoencoders.

Figure 4:
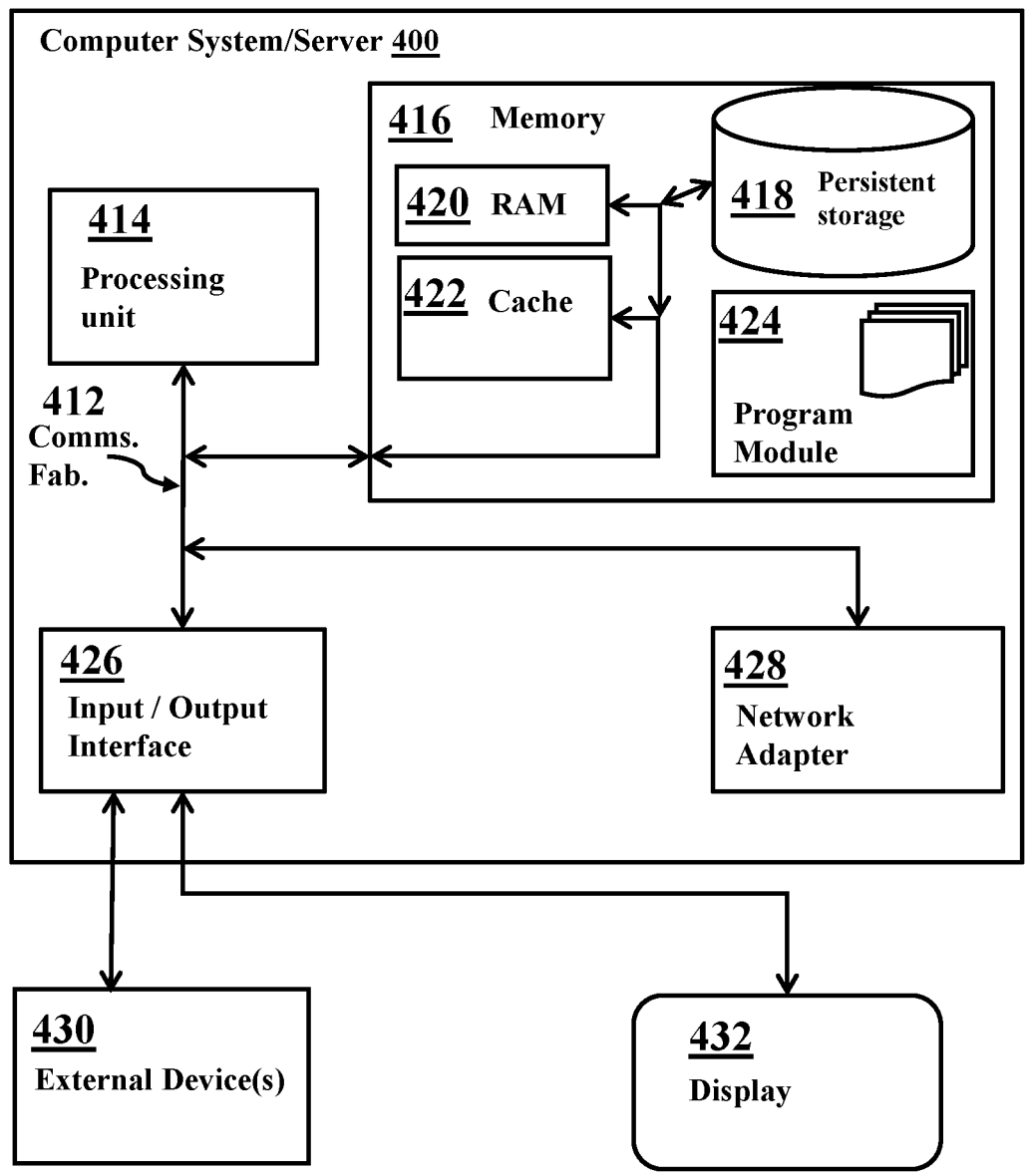
FIG. 4 is a functional block diagram of an exemplary computing system within a learning path framework environment, in accordance with an embodiment of the present invention.

FIG. 4 depicts computer system 400, an example computer system representative of servers 102 and 112 or any other computing device within an embodiment of the invention. Computer system 400 includes communications fabric 412, which provides communications between computer processor(s) 414, memory 416, persistent storage 418, network adaptor 428, and input/output (I/O) interface(s) 426. Communications fabric 412 can be implemented with any architecture designed for passing data and/or control information between processors (such as microprocessors, communications and network processors, etc.), system memory, peripheral devices, and any other hardware components within a system. For example, communications fabric 412 can be implemented with one or more buses.

Computer system 400 includes processors 414, cache 422, memory 416, network adaptor 428, input/output (I/O) interface(s) 426 and communications fabric 412. Communications fabric 412 provides communications between cache 422, memory 416, persistent storage 418, network adaptor 428, and input/output (I/O) interface(s) 426. Communications fabric 412 can be implemented with any architecture designed for passing data and/or control information between processors (such as microprocessors, communications and network processors, etc.), system memory, peripheral devices, and any other hardware components within a system. For example, communications fabric 412 can be implemented with one or more buses or a crossbar switch.

Memory 416 and persistent storage 418 are computer readable storage media. In this embodiment, memory 416 includes persistent storage 418, random access memory (RAM) 420, cache 422 and program module 424. In general, memory 416 can include any suitable volatile or non-volatile computer readable storage media. Cache 422 is a fast memory that enhances the performance of processors 414 by holding recently accessed data, and data near recently accessed data, from memory 416. As will be further depicted and described below, memory 416 may include at least one of program module 424 that is configured to carry out the functions of embodiments of the invention.

The program/utility, having at least one program module 424, may be stored in memory 416 by way of example, and not limiting, as well as an operating system, one or more application programs, other program modules, and program data. Each of the operating systems, one or more application programs, other program modules, and program data or some combination thereof, may include an implementation of a networking environment. Program module 424 generally carries out the functions and/or methodologies of embodiments of the invention, as described herein.

Program instructions and data used to practice embodiments of the present invention may be stored in persistent storage 418 and in memory 416 for execution by one or more of the respective processors 414 via cache 422. In an embodiment, persistent storage 418 includes a magnetic hard disk drive. Alternatively, or in addition to a magnetic hard disk drive, persistent storage 418 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Network adaptor 428, in these examples, provides for communications with other data processing systems or devices. In these examples, network adaptor 428 includes one or more network interface cards. Network adaptor 428 may provide communications through the use of either or both physical and wireless communications links. Program instructions and data used to practice embodiments of the present invention may be downloaded to persistent storage 418 through network adaptor 428.

I/O interface(s) 426 allows for input and output of data with other devices that may be connected to each computer system. For example, I/O interface 426 may provide a connection to external devices 430 such as a keyboard, keypad, a touch screen, and/or some other suitable input device. External devices 430 can also include portable computer readable storage media such as, for example, thumb drives, portable optical or magnetic disks, and memory cards. Software and data used to practice embodiments of the present invention can be stored on such portable computer readable storage media and can be loaded onto persistent storage 418 via I/O interface(s) 426. I/O interface(s) 426 also connect to display 432.

Display 432 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
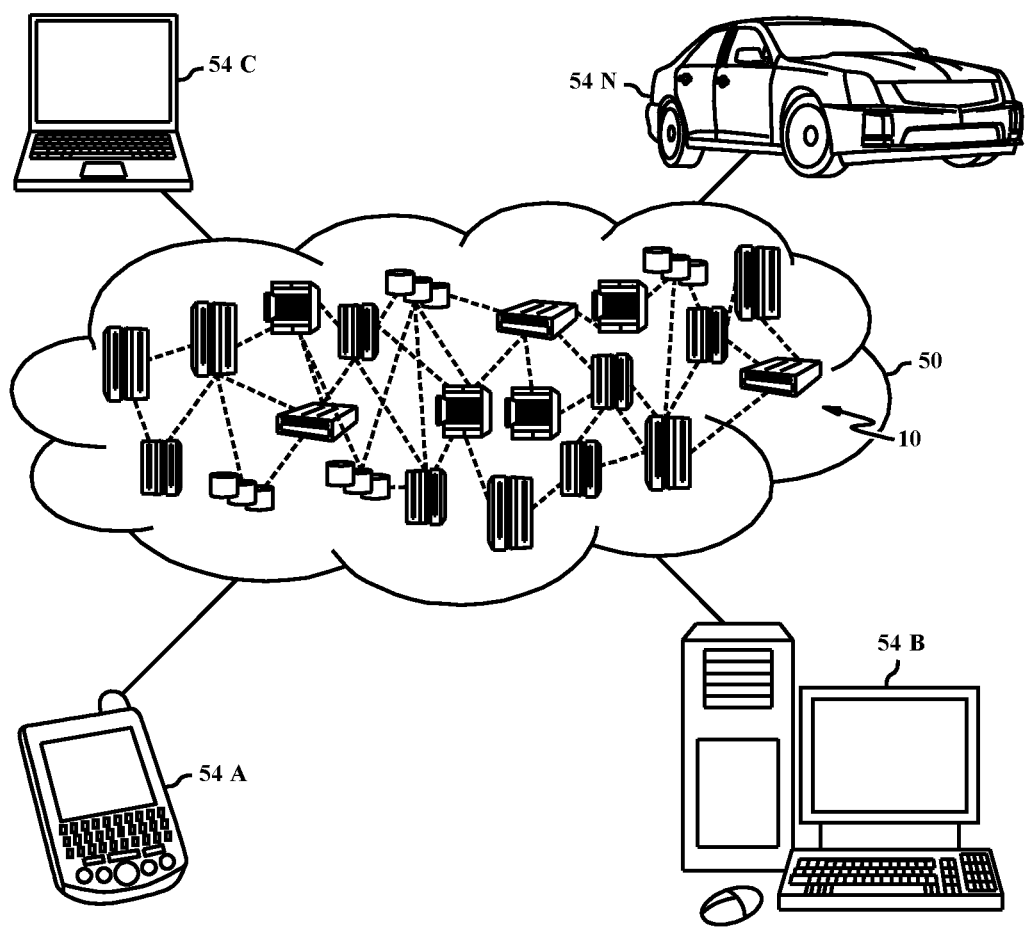
FIG. 5 is a diagram depicting a cloud computing environment, in accordance with an embodiment of the present invention.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
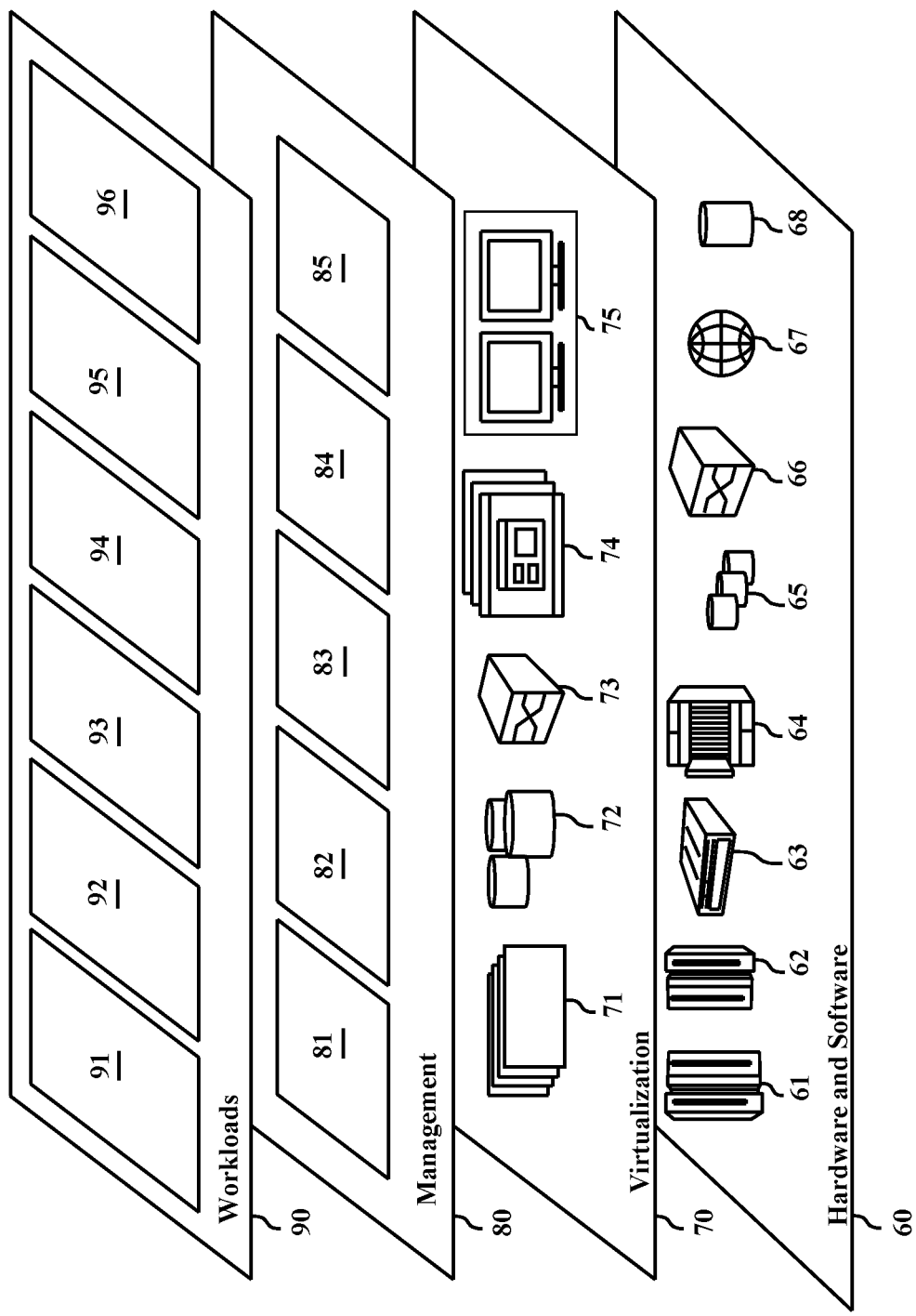
FIG. 6 is a functional block diagram depicting abstraction model layers, in accordance with an embodiment of the present invention.

FIG. 6 is a block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and learning path framework generation 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for cognitive generation of a learning path framework, the method comprising:
   monitoring, by a processor, a knowledge stream of a first user on a CogBot platform, wherein the monitoring of the knowledge stream of the first user is performed by a first cognitive bot ("CogBot");
   generating, by a processor, one or more categories within the subject matter, based on monitoring of the knowledge stream;
   tuning, by a processor, a subject grade-score engine for a subject matter by the first CogBot, based on the knowledge stream of the first user;
   monitoring, by a processor, a knowledge stream of a second user, wherein the monitoring of the knowledge stream of the second user is performed by a CogBot;
   generating, by a processor, a grade-score for the second user, based on monitoring the knowledge stream of the second user by the second CogBot;
   determining, by a processor, an expertise level of the second user for the generated one or more categories, based on the generated grade-score; and
   generating, by a processor, a learning path framework for the second user, based on the determined expertise level of the second user.

2. The computer-implemented method of claim 1, further comprising:
   authenticating, by a processor, the first user to a CogBot platform; and
   authenticating, by a processor, the second user to the CogBot platform.

3. The computer-implemented method of claim 2, wherein the CogBot platform is a cloud based personalized learning subscription service.

4. The computer-implemented method of claim 1, wherein the knowledge stream is comprised of a plurality of predetermined activities within a subject matter.

5. The computer-implemented method of claim 1, further comprising:
   monitoring, by a processor, the knowledge stream of the second user during performance of the learning path framework, wherein the monitoring is performed by the second CogBot;
   determining, by a processor, a second expertise level for the generated one or more categories, based on the knowledge stream of the second user during performance of the learning path framework; and
   updating, by a processor, the learning path framework, based on the determined second expertise level.

6. The computer-implemented method of claim 1, wherein tuning the subject grade-score engine includes the first CogBot building insights based on one or more of the following:
   the first user's time spent on an activity, a score of the first user's activity, and the number of times the first user accesses a topic.

7. The computer-implemented method of claim 1, further comprising:
   receiving, by a processor, a topic objective from the second user, wherein the topic objective is the purpose of the learning path framework; and
   aligning, by a processor, the generated one or more categories based on the topic objective.

8. A computer system for cognitive generation of a learning path framework, the method comprising:
   a memory; and
   a processor in communication with the memory, the processor being configured to perform operations comprising:
   monitor a knowledge stream of a first user on a CogBot platform, wherein the monitoring of the knowledge stream of the first user is performed by a first cognitive bot ("CogBot");
   generate one or more categories within the subject matter, based on monitoring of the knowledge stream;
   tune a subject grade-score engine for a subject matter by the first CogBot, based on the knowledge stream of the first user;
   monitor a knowledge stream of a second user, wherein the monitoring of the knowledge stream of the second user is performed by a CogBot;
   generate a grade-score for the second user, based on monitoring the knowledge stream of the second user by the second CogBot;
   determine an expertise level of the second user for the generated one or more categories, based on the generated grade-score; and
   generate a learning path framework for the second user, based on the determined expertise level of the second user.

9. The computer-system of claim 8, further comprising:
   authenticate the first user to a CogBot platform; and
   authenticate the second user to the CogBot platform.

10. The computer-system of claim 9, wherein the CogBot platform is a cloud based personalized learning subscription service.

11. The computer-system of claim 8, wherein the knowledge stream is comprised of a plurality of predetermined activities within the subject matter.

12. The computer-system of claim 8, further comprising instructions to:
  monitor the knowledge stream of the second user during performance of the learning path framework, wherein the monitoring is performed by the second CogBot;
  determine a second expertise level for the generated one or more categories, based on the knowledge stream of the second user during performance of the learning path framework; and
  update the learning path framework, based on the determined second expertise level.

13. The computer-system of claim 8, wherein tuning the subject grade-score engine includes the first CogBot building insights based on one or more of the following: the first user's time spent on an activity, a score of the first user's activity, and the number of times the first user accesses a topic.

14. The computer-system of claim 8, further comprising:
  receive a topic objective from the second user, wherein the topic objective is the purpose of the learning path framework; and
  align the generated one or more categories based on the topic objective.

15. A computer program product for cognitive generation of a learning path framework having program instructions embodied therewith, the program instructions executable by a processor to cause the processors to perform a function, the function comprising:
  monitor a knowledge stream of a first user on a CogBot platform, wherein the monitoring of the knowledge stream of the first user is performed by a first cognitive bot ("CogBot");
  generate one or more categories within the subject matter, based on monitoring of the knowledge stream;
  tune a subject grade-score engine for a subject matter by the first CogBot, based on the knowledge stream of the first user;
  monitor a knowledge stream of a second user, wherein the monitoring of the knowledge stream of the second user is performed by a CogBot;
  generate a grade-score for the second user, based on monitoring the knowledge stream of the second user by the second CogBot;
  determine an expertise level of the second user for the generated one or more categories, based on the generated grade-score; and
  generate a learning path framework for the second user, based on the determined expertise level of the second user.

16. The computer program product of claim 15, further comprising:
  authenticate the first user to a CogBot platform; and
  authenticate the second user to the CogBot platform.

17. The computer program product of claim 16, wherein the CogBot platform is a cloud based personalized learning subscription service.

18. The computer program product of claim 15, wherein the knowledge stream is comprised of a plurality of predetermined activities within the subject matter.

19. The computer program product of claim 15, further comprising instructions to:
  monitor the knowledge stream of the second user during performance of the learning path framework, wherein the monitoring is performed by the second CogBot;
  determine a second expertise level for the generated one or more categories, based on the knowledge stream of the second user during performance of the learning path framework; and
  update the learning path framework, based on the determined second expertise level.

20. The computer program product of claim 15, wherein tuning the subject grade-score engine includes the first CogBot building insights based on one or more of the following:
  the first user's time spent on an activity, a score of the first user's activity, and the number of times the first user accesses a topic.

* * * * *